United States Patent [19]
Kato

[11] Patent Number: 5,564,218
[45] Date of Patent: Oct. 15, 1996

[54] LURE

[75] Inventor: Seiji Kato, Ishikawa, Japan

[73] Assignee: Daiwa Seiko, Inc., Tokyo, Japan

[21] Appl. No.: 326,366

[22] Filed: Oct. 20, 1994

[30] Foreign Application Priority Data

Oct. 28, 1993 [JP] Japan .................................. 5-292677

[51] Int. Cl.⁶ .................................................. A01K 85/00
[52] U.S. Cl. ........................ 43/42.13; 43/42.19; 43/42.2
[58] Field of Search ............................ 43/42.11, 42.13, 43/42.19, 42.2, 42.12

[56] References Cited

U.S. PATENT DOCUMENTS

| | | | |
|---|---|---|---|
| 1,731,161 | 10/1929 | Farley | 43/42.13 |
| 1,797,234 | 3/1931 | Jordan | 43/42.2 |
| 1,820,887 | 8/1931 | Plueger | 43/42.13 |
| 1,856,043 | 4/1932 | Pflueger | 43/42.19 |
| 1,871,971 | 8/1932 | Eppich | 43/42.2 |
| 1,897,529 | 2/1933 | Palmer | 43/42.2 |
| 3,397,478 | 8/1968 | Lowes | 43/42.2 |
| 4,201,008 | 5/1980 | Sparkman . | |
| 4,447,980 | 5/1984 | Bassett | 43/42.2 |
| 4,510,710 | 4/1985 | Hanna | 43/42.13 |
| 4,637,158 | 1/1987 | Reid | 43/42.19 |
| 4,891,901 | 1/1990 | Baker | 43/42.13 |

*Primary Examiner*—Kurt Rowan
*Attorney, Agent, or Firm*—Longacre & White

[57] ABSTRACT

The invention relates to a lure performing a new action which attracts a fish to make a good catch of fishing. The lure includes: a rotary member 16 rotated by the action of resistance to a water current; and a extrusion member 18 moved with the rotary member 16, resisting the water current so as to extrude water forward.

7 Claims, 3 Drawing Sheets

LURE

BACKGROUND OF THE INVENTION

The present invention relates to a lure used for fishing.

The U.S. Pat. No. 4,201,008 discloses a lure having a rotational plate member which is rotatable by the action of resistance to a water current. This lure is primarily used for fishing a black bass and referred to as a spinner bait or a bass bait. When this lure is pulled, the rotational plate member is rotated by the resistance to a water current so that splashes, bubbles, water streams along blade surfaces (resistant surfaces) and sound are caused, which attract a fish to be hooked.

However, splashes, bubbles and water streams caused by the lure described above are directed only upward and backward. From the experimental viewpoint, a fish is not sufficiently attracted by the splashes, bubbles and water streams caused by this lure. Accordingly, it is impossible to make a good catch.

SUMMARY OF THE INVENTION

It is an object of the present invention to make a good catch of fishing by devising the operation of a lure.

In view of the above object, the present invention is to provide a lure comprising: a rotary member rotatable by the action of resistance to a water current; and a extrusion member moved with the rotary member, resisting the water current so as to extrude water forward.

The lure of the present invention may be arranged such that the extrusion member is formed integrally with the rotary member so as to rotate in the same direction as that of the rotary member. Also, the lure of the present invention may be arranged such that the extrusion member is formed differently or separately from the rotary member and coupled thereto, for instance through a gear means, so as to rotate in a direction opposite to that of the rotary member. When the gear means is used, it is possible to change the rotational directions and the rotational speeds of the rotary member and the extrusion member.

Further, it is preferable that the rotary member and the extrusion member are respectively provided with plate-shaped resistant surfaces rotated by the action of resistance to a water current, and the resistant surface of the body of rotation is larger than that of the extrusion member. In this case, the smooth rotation of the extrusion member can be achieved in linking with the rotation of the rotary member. In stead of the plate-shaped resistant surface, spiral grooves may be provided on bodies of the rotary member and the extrusion member.

Moreover, it is also preferable that the rotary member and the extrusion member are integrally formed from one piece of plate member, and a direction of the resistant surface of the extrusion member is opposite to that of the rotary member with respect to the resistance to a water current. Alternatively, it is possible that the rotary member and the extrusion member are formed separately formed from different plate members, and are arranged such that a direction of the resistant surface of the extrusion member is the same as that of the rotary member. In this case, the extrusion member is forcibly rotated in a direction opposite to the rotational direction of the rotary member by the action of gear transmission mechanism.

The lure of the invention includes an extrusion member rotatably moved with a rotary member rotated by the action of resistance to a water current, so that the extrusion member is rotated resisting the water current. Therefore, not only the rotary member generates splashes and bubbles of water backward but also the extrusion member generates splashes and bubbles of water forward. Therefore, it is possible for the lure to show an appearance as if a small fish jumped and swam on the water surface. In this way, the lure is capable of attracting a fish greatly.

DETAILED DESCRIPTION OF THE PREFERRED EMBODIMENTS

With reference to preferred embodiments shown in the accompanying drawings, a lure of the present invention will be explained in more detail.

Figure 1:
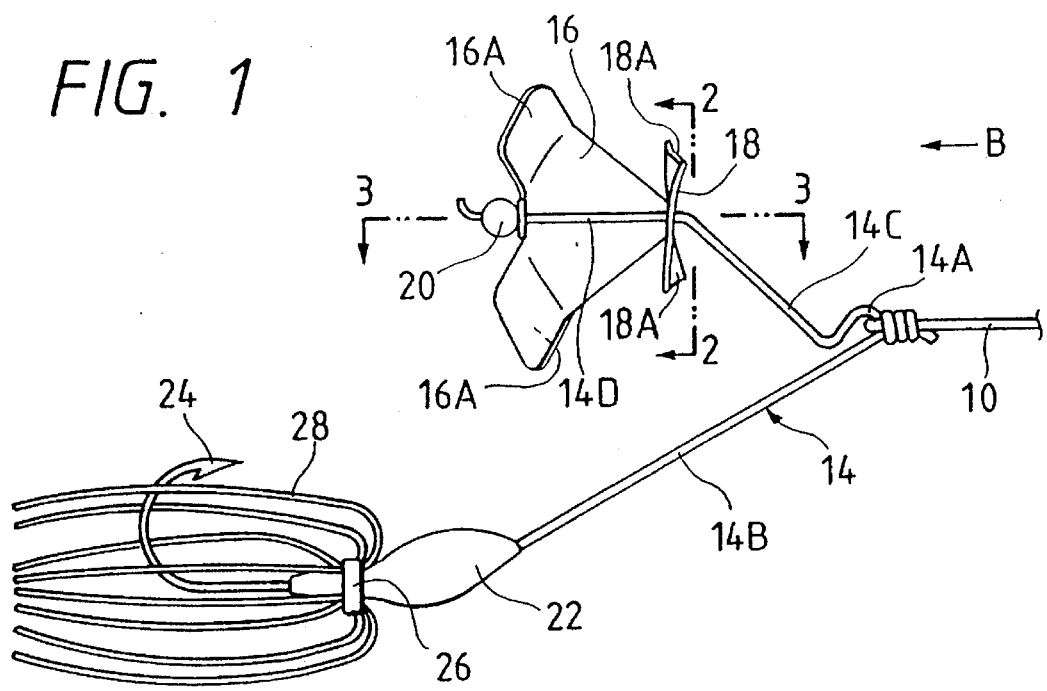
FIG. 1 is a side view of a lure according to a first embodiment of the present invention.
Figure 2:
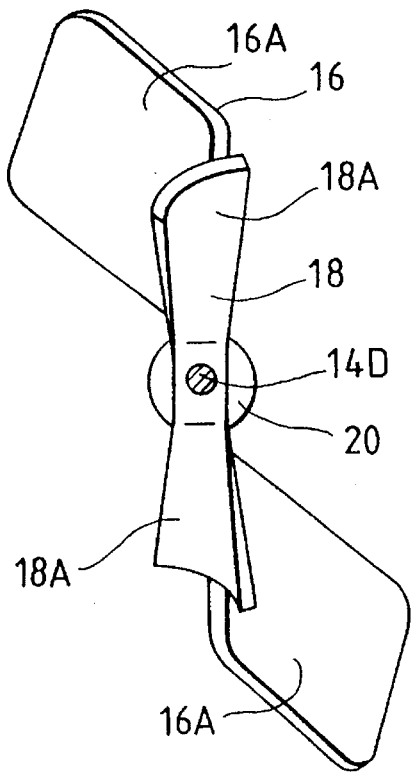
FIG. 2 is a front view taken on arrow line 2—2 in FIG. 1.
Figure 3:
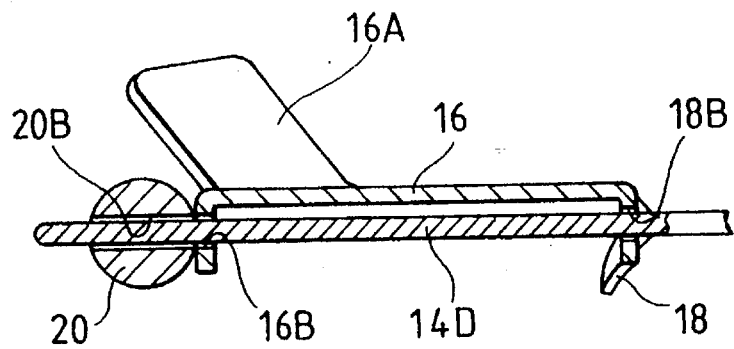
FIG. 3 is a sectional view taken on arrow line 3—3 in FIG. 1.

FIGS. 1 through 3 show a lure of the present invention. A base section 14 made of a wire rod is bent at a fishing line connecting section 14A to which a fishing line 10 is connected. A fishhook 24 is attached to an end of one arm 14B, and a rotary member 16, which will be described later, is attached to the other arm 14C.

A weight 22 is attached to the arm 14B, and a skirt 28 is attached to a position close to the root of the fishhook 24 with an attaching ring 26. Due to this weight 22, the lure can be easily cast. Due to the existence of this skirt 28, when the lure is pulled after being cast onto the water surface, it can stably swim in the water, at the same time the skirt 28 can hide the fishhook 24.

Figure 5:
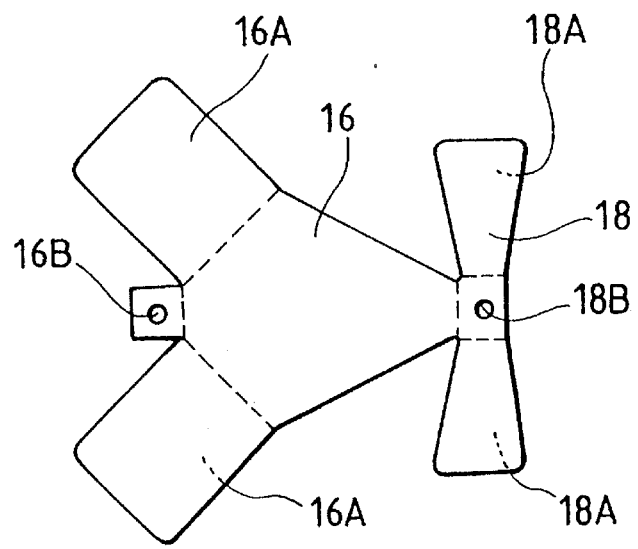
FIG. 5 is a development of parts shown in FIG. 2.

On the other hand, the other arm 14C is extended to form a shaft 14D, and a rotary member 16 capable of rotating freely and a bead 20 are attached around the shaft 14D. A extrusion member 18 for extruding water is attached at a position in front of the rotary member 16. In this embodiment, the rotary member 16 and the extrusion member 18 are integrally formed from one piece of plate member, and its development is shown in FIG. 5. The bead 20 is idly engaged with the shaft 14D through a central hole 20B, and the rotary member 16 and the extrusion member 18 are idly engaged with the shaft 14D through attaching holes 16B and 18B. Therefore, the bead 20, rotary member 16 and extrusion member 18 can be freely rotated.

When the plate member is bent or twisted along the broken lines shown in FIG. 5, the rotary member 26 and the extrusion member 18 are formed. In this case, the bending is carried out in the following manner: When water flows in a direction shown by the arrow B in FIG. 1, a resistant surface 16A of the rotary member 16 receives a water current resistance in a direction, and a resistant surface 18A of the extrusion member 18 receives a water current resistance in an opposite direction. That is to say, the bending of the plate member is carried out so that the rotational direction of the rotary member 16 can be opposite to that of the extrusion member 18 when water flows in a direction shown by the arrow B in FIG. 1 Since the lure is constructed in the manner described above, when the fishing line 10 is pulled in the direction of arrow D in the water as illustrated in FIG. 4, the rotary member 16 receives the water current resistance in the direction opposite to the direction of arrow D, so that the rotary member 16 is rotated in a direction shown by the arrow in FIG. 4.

On the other hand, as described before, the resistant surfaces 18A and 16A are twisted so that the rotational direction of the extrusion member 18 can be opposite to that of the rotary member 16. Accordingly, the extrusion member 18 receives the water current resistance as illustrated in FIG. 4, and it is going to be rotated in a direction opposite to the arrow which is the rotational direction of the rotary member 16. However, the rotary member 16 and the extrusion member 18 are integrated into one body, and further the resistant surface 16A is formed wider than the resistant surface 18A so that a torque generated by the resistant surface 16A of the rotary member 16 can be higher than a torque generated by the resistant surface 18A of the extrusion member 18. Accordingly, the extrusion member 18 is forced to rotate in the rotational direction of the rotary member 16 which is rotated by the action of the water current resistance.

Figure 4:
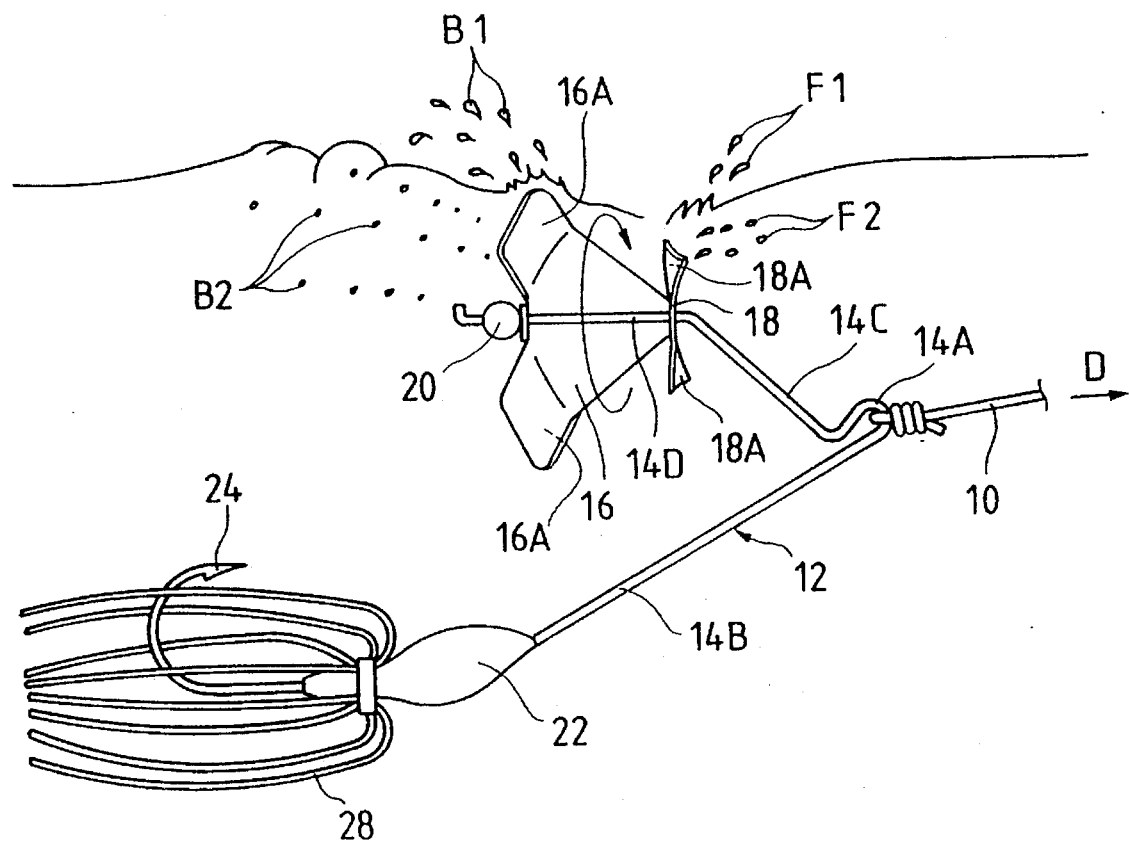
FIG. 4 is schematic illustration showing the operation of the lure shown in FIG. 1.

Consequently, as illustrated in FIG. 4, while the lure is pulled forward, the rotary member 16 lets water flow backward and generates bubbles B2 backward and scatters splashes B1 upward in the rear of the rotary member 16. At this time, while the extrusion member 18 extrudes water forward, it can scatter the foams F2 and splashes F1 forward. Accordingly, when this lure is pulled in the water, the lure not only scatters the foams and bubbles backward in the manner of a conventional lure but also it scatters them forward. Therefore, the lure pretends to be a small fish trying to run away. Therefore, the lure strongly attracts a fish that is going to attack it.

When a metal sheet is punched and bent to form the rotary member 16 and the extrusion member 18 of this embodiment, they can be integrally formed, so that the cost of formation can be reduced.

Figure 6:
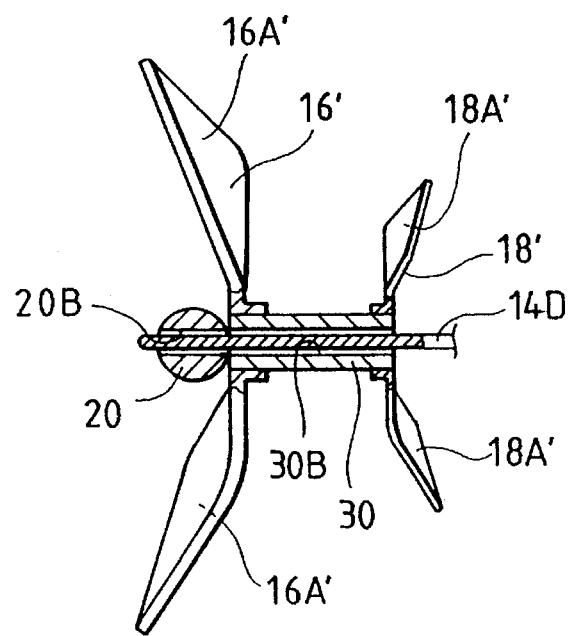
FIG. 6 is a longitudinal sectional view of a primary portion of a lure according to a second embodiment of the present invention.

FIG. 6 shows a rotary member and an extrusion member of a lure according to a second embodiment of the present invention. In this embodiment, the rotary member 16' and the extrusion member 18' are separately formed and integrally connected by an cylindrical member 30 having a central hole 30B. The shaft 14D is idly inserted into the central hole 30B. In the same manner as that of the first embodiment, a resistant surface 16A' of the rotary member 16' and a resistant surface 18A' of the extrusion member 18' are twisted so that they are respectively rotated in a direction opposite to each other when the resistant surfaces 16A' and 18A' receive the resistance of a water current.

In the above embodiment, the cylindrical body 30 is made of a substantially rigid material such as metal or resin. For example, when both members 16' and 18' are connected by a cylindrical member made of a soft material such as rubber, the same effect as that of the above example can be provided, although there is a time delay when both members are rotated at the same speed. Accordingly, even if a soft member such as rubber is used, it can be said that the apparatus is integrally constructed as specified by the present invention.

Unlike the above embodiments, even when the rotary member and the extrusion member are not formed from a plate member, that is, even when the rotary member and the extrusion member are formed from a cylindrical, circular-columnar, cone-shaped or spindle-shaped (columnar) member, and even when spiral grooves are formed on the external surface of the bodies, when the spiral grooves are twisted in the opposite direction and the rotary member is formed larger than the extrusion member, splashes of water can be scattered forward in the same manner as that of the embodiments described before. Also, a plate member and a columnar member on which a spiral groove is formed may be combined so as to provide the rotary member and the extrusion member.

When the rotary member and the extrusion member are rotated together by the action of a gear mechanism, and when each member is composed of a plate member, it is not necessary that the bodies are twisted in the opposite direction with respect to the water current like the first embodiment. Even if they are twisted in the same direction, splashes of water can be scattered forward when the rotational directions of the members are opposite to each other. In the case of a columnar member on which a spiral groove is formed, the circumstances are the same.

As can be seen from the above explanations, the lure of the present invention includes a extrusion member rotated against the water current in linking with the rotation of the rotary member when the rotary member is rotated by the resistance to a water current. Accordingly, not only splashes and bubbles of water are generated backward by the rotary member but also splashes and bubbles are generated forward by the extrusion member. Accordingly, it is possible to show an appearance in which the lure pretends to be a small fish trying to run away on the surface of water. Therefore, the lure strongly attracts a fish that is going to attack it. Accordingly, it is possible to get a good catch of fish with the lure of the present invention.

What is claimed is:

1. A lure comprising:

a rotary member mounted on a shaft and formed to rotate in a first direction by the action of resistance of a water current against said rotary member; and an extrusion member having a portion formed to resist rotation in said first direction by the action of resistance of said water current against said extrusion member, said extrusion member and said portion being driven by said rotary member to rotate in said first direction so that said portion of said extrusion member extrudes water in a direction opposite to said water current, wherein said extrusion member is located forward of said rotary member with respect to said water current.

2. A lure according to claim 1, wherein said extrusion member is formed integrally with said rotary member.

3. A lure according to claim 1, wherein said extrusion member is separately formed from said rotary member and coupled thereto through a torque transmission means.

4. A lure according to claim 3, wherein said torque transmission means includes a cylindrical member supporting said rotary member at one end thereof and said extrusion member at the other end thereof.

5. A lure comprising:

a rotary member mounted on a shaft and formed to rotate in a first direction by the action of resistance of a water current against said rotary member; and an extrusion member having a portion formed to resist rotation in said first direction by the action of resistance of said water current against said extrusion member, said extrusion member and said portion being driven by said rotary member to rotate in said first direction so that said portion of said extrusion member extrudes water in a direction opposite to said water current, wherein said extrusion member is located forward of said rotary member with respect to said water current; wherein, said rotary member and said extrusion member are respectively provided with plate-shaped resistant surfaces for receiving the resistance of said water current to generate rotational torque for said rotary member and said extrusion member, said resistance surface of said rotary member is larger than said resistance surface of said extrusion member, and said rotary member and said extrusion member are integrally formed from one piece of a plate member.

6. A spinner adapted to be rotatably supported on a rod portion of a fishing lure; said spinner comprising:

a rotary member having an attaching hole for rotatably supporting said rotary member on said rod portion and a rotary wing for receiving a first resistance from a water current, said rotary wing formed to rotate said rotary member in a first direction under action of said first resistance;

an extrusion member having an attaching hole for rotatably supporting said extrusion member on said rod portion and an extrusion wing for receiving a second resistance from said water current, said extrusion wing formed to resist rotation in said first direction under action of said second resistance; and a rotation torque transmission means for transmitting a rotational torque from said rotary member to said extrusion member, said first resistance being greater than said second resistance whereby said extrusion member is driven by said rotary member to forcibly rotate in said first direction.

7. A spinner according to claim 6, wherein said transmission means is made up by an integral formation of said rotary member with said extrusion member.

* * * * *